US012100911B2

(12) United States Patent
Bedage et al.

(10) Patent No.: US 12,100,911 B2
(45) Date of Patent: Sep. 24, 2024

(54) VIBRATION RESISTANT CONNECTOR CAP

(71) Applicant: Deere & Company, Moline, IL (US)

(72) Inventors: Rohit B. Bedage, Pune (IN); Shaligram D. Tambe, Pune (IN); Nakib Y. Siddiqui, Pune (IN); Dattatray B. Pingle, Pune (IN); Bradley R. Watkins, Cedar Falls, IA (US); Craig A. Purvis, Gladbrook, IA (US)

(73) Assignee: Deere & Company, Moline, IL (US)

( * ) Notice: Subject to any disclaimer, the term of this patent is extended or adjusted under 35 U.S.C. 154(b) by 244 days.

(21) Appl. No.: 17/517,788

(22) Filed: Nov. 3, 2021

(65) Prior Publication Data

US 2023/0132665 A1 May 4, 2023

(51) Int. Cl.

*H01R 13/639* (2006.01)
*H01R 43/26* (2006.01)
*H01R 13/627* (2006.01)

(52) U.S. Cl.

CPC ........... *H01R 13/639* (2013.01); *H01R 43/26* (2013.01); *H01R 13/6271* (2013.01); *H01R 2201/26* (2013.01)

(58) Field of Classification Search

CPC .................................................... H01R 13/639
See application file for complete search history.

(56) References Cited

U.S. PATENT DOCUMENTS 4,998,894 A * 3/1991 Gronvall ............ H01R 13/5216 439/936
5,338,211 A * 8/1994 Kodama .............. H01R 13/639 439/367
5,561,269 A * 10/1996 Robertson ............ H02G 15/113 174/92
6,234,823 B1 * 5/2001 Fuess ................. H01R 13/5816 439/367
6,881,901 B2 * 4/2005 Egan .................... H02G 15/013 174/665
6,948,976 B2 * 9/2005 Goodwin ............... H01R 13/52 439/607.41
6,955,558 B1 * 10/2005 Low ....................... H02G 15/18 439/587
7,285,725 B1 * 10/2007 Saman ............... H01R 13/6392 174/92
7,384,297 B2 * 6/2008 King, Jr. .............. H02G 15/007 439/369
7,648,384 B2 * 1/2010 Desissard .......... H01R 13/5213 174/67
7,794,288 B2 9/2010 Shindo et al.

(Continued)

*Primary Examiner* — Neil Abrams
(74) *Attorney, Agent, or Firm* — Tucker Ellis LLP; Michael G. Craig

(57) ABSTRACT

One or more techniques and/or systems are disclosed for a vibration mitigation device. The vibration mitigation device can comprise a shell forming a hollow body that is configured to house a coupled wiring connector and a connector block. The shell can comprise first shell section and second shell section that are operably engaged with each other, and engaged with a vehicle component to which the connector block is engaged. The shape and sizing of the shell and its hollow body allow for a compressive force to be applied to the coupled connectors, to mitigate vibration between the two connectors during use.

20 Claims, 14 Drawing Sheets

(56) References Cited

U.S. PATENT DOCUMENTS

| | | | | |
|---|---|---|---|---|
| 7,798,837 | B1 * | 9/2010 | Gardner ............... | G01G 23/017 174/92 |
| 8,422,247 | B2 | 4/2013 | Kameyama | |
| 10,658,786 | B2 * | 5/2020 | Refai ................. | H01R 13/5202 |
| 11,075,480 | B2 | 7/2021 | Misaiji et al. | |
| 11,189,963 | B2 | 11/2021 | Kawashima et al. | |
| 11,664,624 | B2 * | 5/2023 | Lutowsky, Jr. ........ | H01R 13/73 439/345 |
| 2002/0009932 | A1 | 1/2002 | Inaba et al. | |
| 2017/0222358 | A1 | 8/2017 | Hashimoto et al. | |
| 2023/0104418 | A1 * | 4/2023 | Krah .................... | H01R 13/516 439/367 |
| 2023/0132665 | A1 * | 5/2023 | Bedage ................ | H01R 13/533 439/382 |

* cited by examiner

VIBRATION RESISTANT CONNECTOR CAP

Vehicles and other machines that comprise an engine, or other power source, utilize wiring to convey electrical and data signals, for example. Wiring is often bundled together in a wiring harness that can be conveniently routed in and around the various components of the vehicle or machine. A wiring harness can be made of bundled wires that can meet another set of one or more wires, or meet a component of the machine, to be joined by wiring connectors or couplers to electrically couple the two sets of wires or wires to the component. Often, connectors/couplers comprise some type of releasable fastener that may hold two couplers together during use to mitigate them coming apart. Further, during use, the connections may be subject to vibration and sudden shock from the movement of the engine and/or the vehicle.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for a vibration protection device, such as a to mitigate vibration and/or shock that wiring connections may be subjected to during use. Such a device can be used to at least partially enclose a connection between two couplers (e.g., electrical connectors from a wiring harness and a component connector block) in a vehicle, for example, used to couple a wiring harness to a connection on a vehicle component. The protection device can house comprise two sections that form a hollow body to house the coupled connectors, and apply a compressive force to mitigate vibration between the electrical couplings between the connectors.

In one implementation of a vibration mitigation device, a shell can comprise two at least partially selectably separable sections forming a hollow body shaped to operably fit around a combination of a wiring connector coupled with a connector block in an engagement that mitigates movement of the wiring connector with respect to the connector block. The shell body can comprise a first shell section that operably covers at least a first portion of the connector block and a portion of the wiring coupler. The first shell section can comprise a first latch assembly that selectably latches onto at least a portion of the connector block, to operably fixedly engage the first latch assembly with the connector block or a portion of the component; and a second latch assembly. The shell body can further comprise a second shell section that operably covers at least a second portion of the coupled connector block wiring coupler to allow for selectably disposing the coupled wiring coupler and connector block inside the body. Here, the second shell section can comprise a third latch assembly that selectably engages the second latch assembly to operably, fixedly hold the coupled connector block and wiring coupler together in electrical engagement.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

Figure 1A:
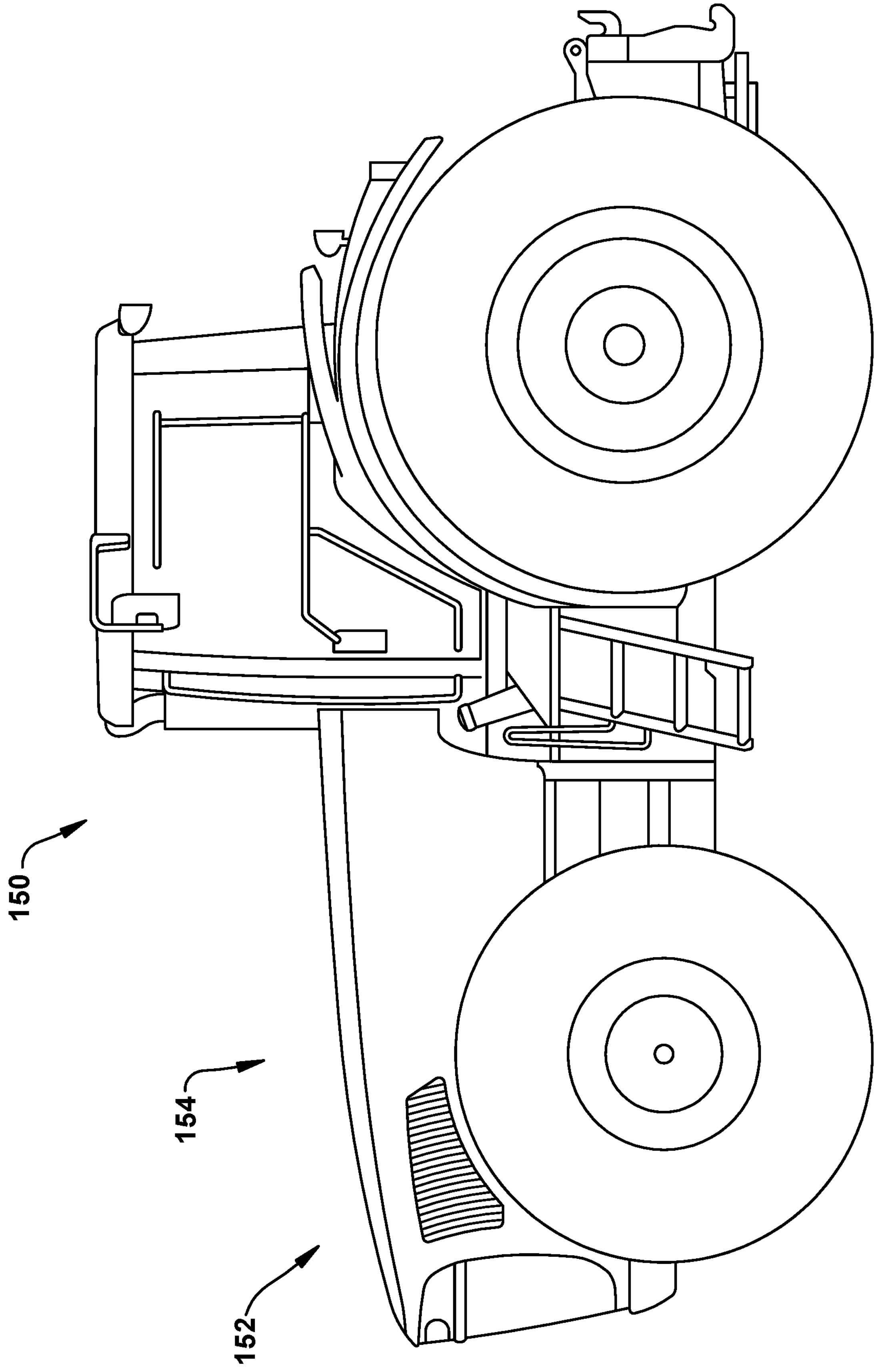
FIGS. 1A and 1B are component diagrams illustrating an example vehicle, and portions thereof, where one or more portions of one or more systems described herein may be implemented.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A vibration mitigation device can be devised that can be operably coupled with a wiring connector used in a vehicle. For example, the vibration mitigation device can provide protection to wiring and wiring connector in a vehicle from vibration and shock during use, from paint intrusion during painting, and from contaminants and physical damage during vehicle operation. Further, the device described herein can be configured to hold connectors together firmly such that vibration or shock encountered during use may not affect the connection between connection pins and connection sockets (e.g., or similar connections).

That is, for example, a first connector can comprise electrical couplers (e.g., pins, buttons, plates, wire, etc.), and second connector can comprise complementary electrical couplers, such that when the first and second connectors are engaged they complete an electrical coupling between them. In current and prior coupler connections, the complementary connectors are releasably connected for maintenance, etc., such that the connection cannot be firmly engaged. In these existing connectors, vibration during use can cause the electrical couplers to vibrate or rubbing against each other resulting in undesired wear and damage. The vibration mitigation device described herein can mitigate this potential damage by holding the connectors and couplers together more firmly after engagement, and potentially dissipate vibration and shock. Additionally, the device described herein can provide for protection from contaminants and physical damage to the connection and coupling, and thermal protection during use.

Figure 1B:
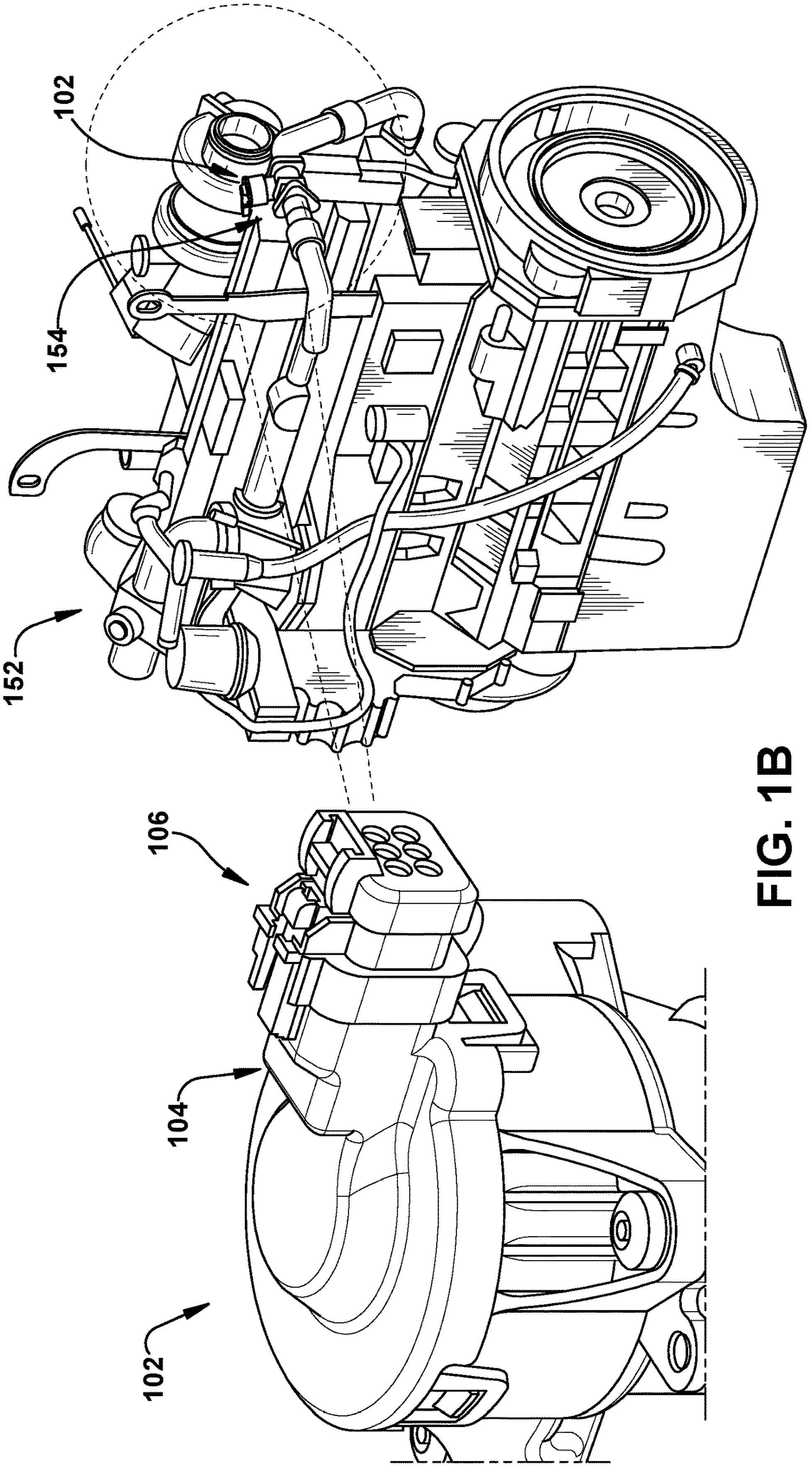

FIGS. 1A and 1B are component diagram illustrating an example implementation of an example use of the vibration mitigation device described herein. In this example, an agricultural or construction vehicle 150, such as a tractor, hauler, or the like, can be powered by an engine 152. In this example, the engine 152 may utilize certain wiring systems 154, wiring, wiring harnesses, wiring connectors/couplers, etc., for use in electrical and communication coupling, for example. In this example, a wiring system 154 can comprise one or more wiring connectors, which are coupled together and/or connect wiring to a vehicle component. As an example, a wiring harness can comprise a connector that is operably connected to an air throttle or an exhaust gas recirculation (EGR) valve (e.g., or other components) to provide sensor data and/or control signals.

As one example, as illustrated in FIG. 1B, an engine component 102 (e.g., throttle body, EGR valve, one or more sensors, etc.) can be disposed on the engine 152 and coupled to the wiring system 154 (e.g., to transmit and/or receive data signals). In this example, the engine component 102 can comprise a wiring harness connector 104, which is configured to be coupled to (e.g., electrically, communicatively) the wiring system 154. Further, in this example, a wiring harness connector 106 can be coupled with the wiring system 154, and be configured to engage with the component connector housing 104, such as a connector block. In this way, in this example, the engine component 102 can be electrically coupled with the wiring system 154.

Figure 2B:
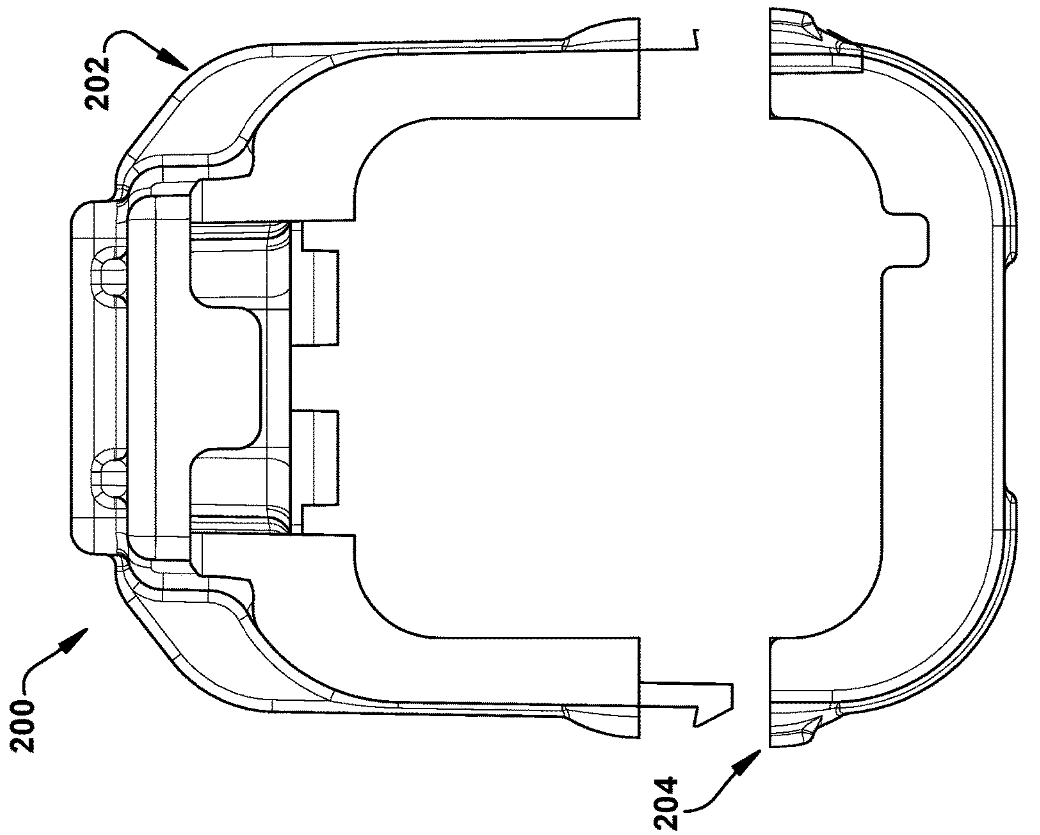
FIGS. 2A, 2B, 2C, 2D, 2E and 2F are component diagrams illustrating various views of one implementation of a vibration mitigating connector cap, as described herein.
Figure 2A:
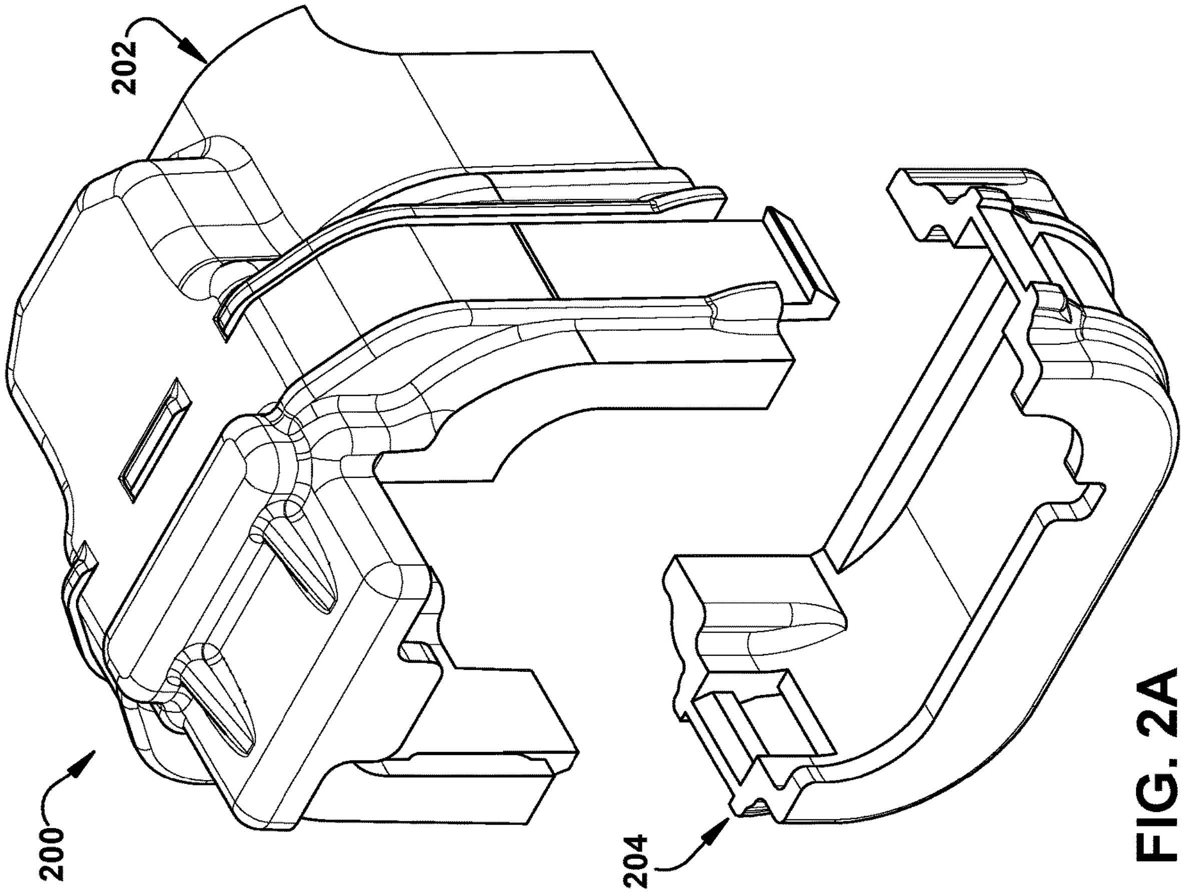
Figure 2D:
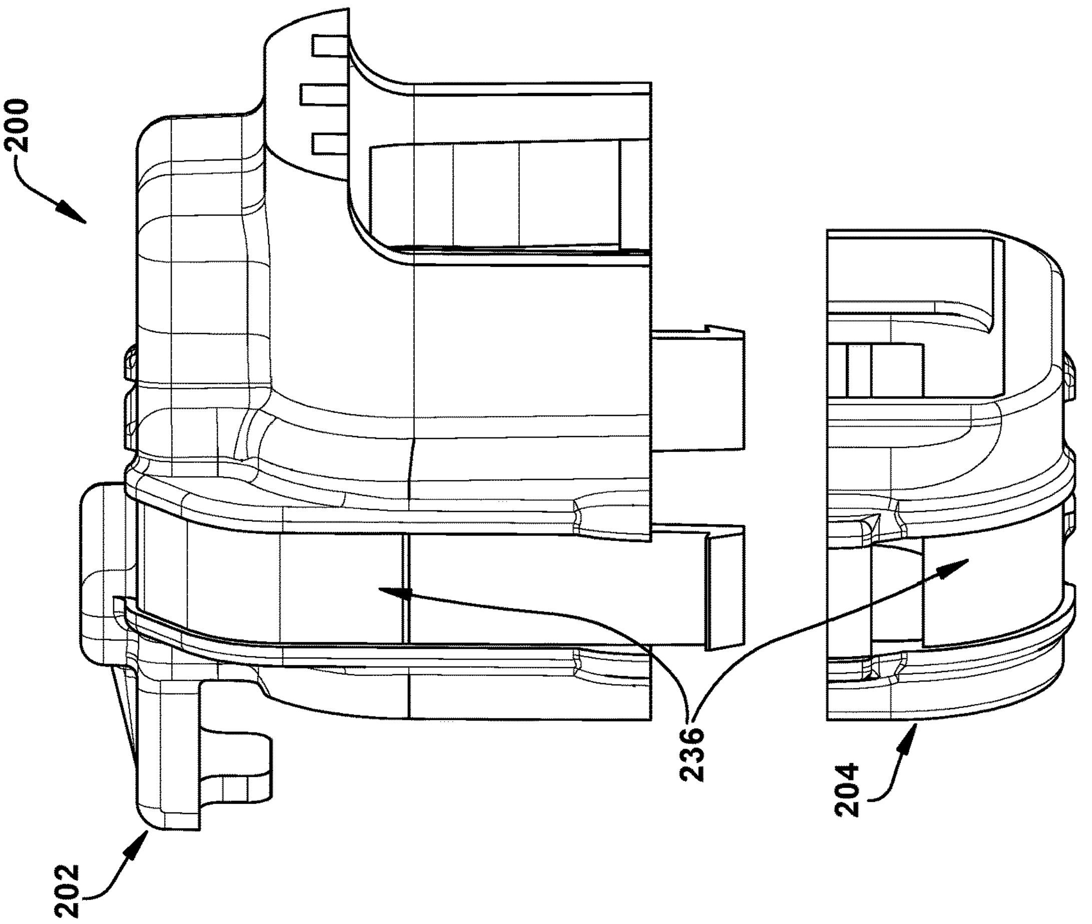
Figure 2C:
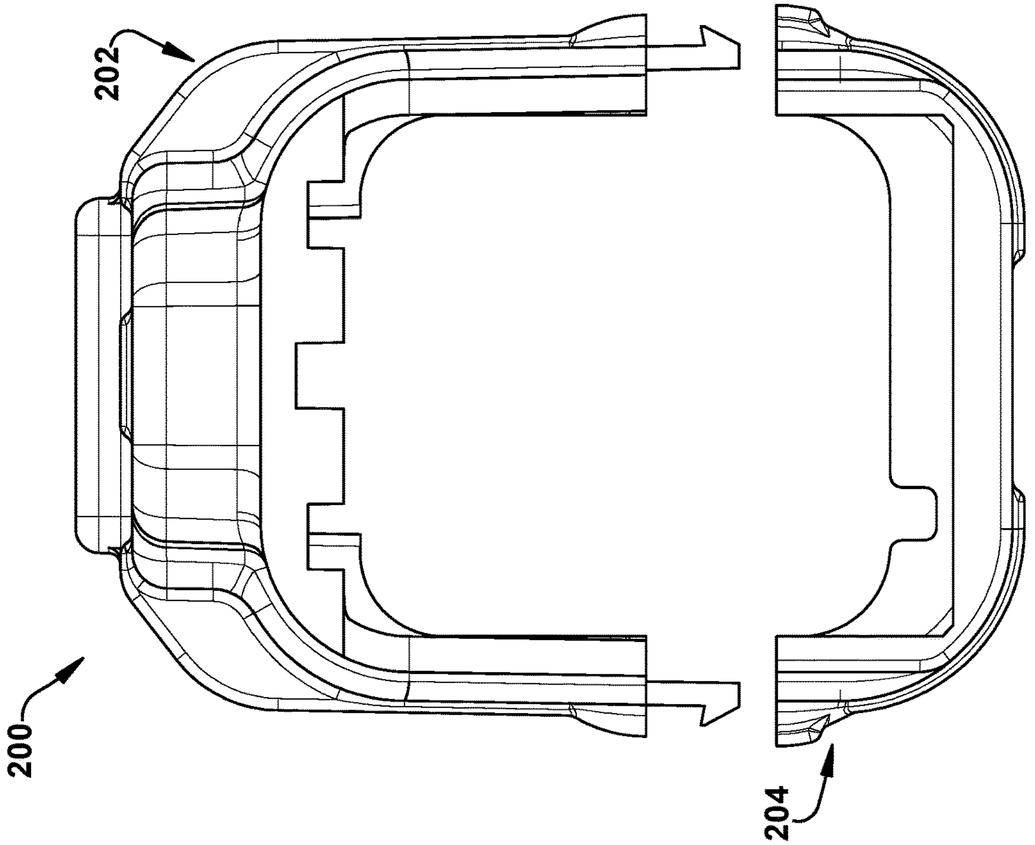
Figure 2F:
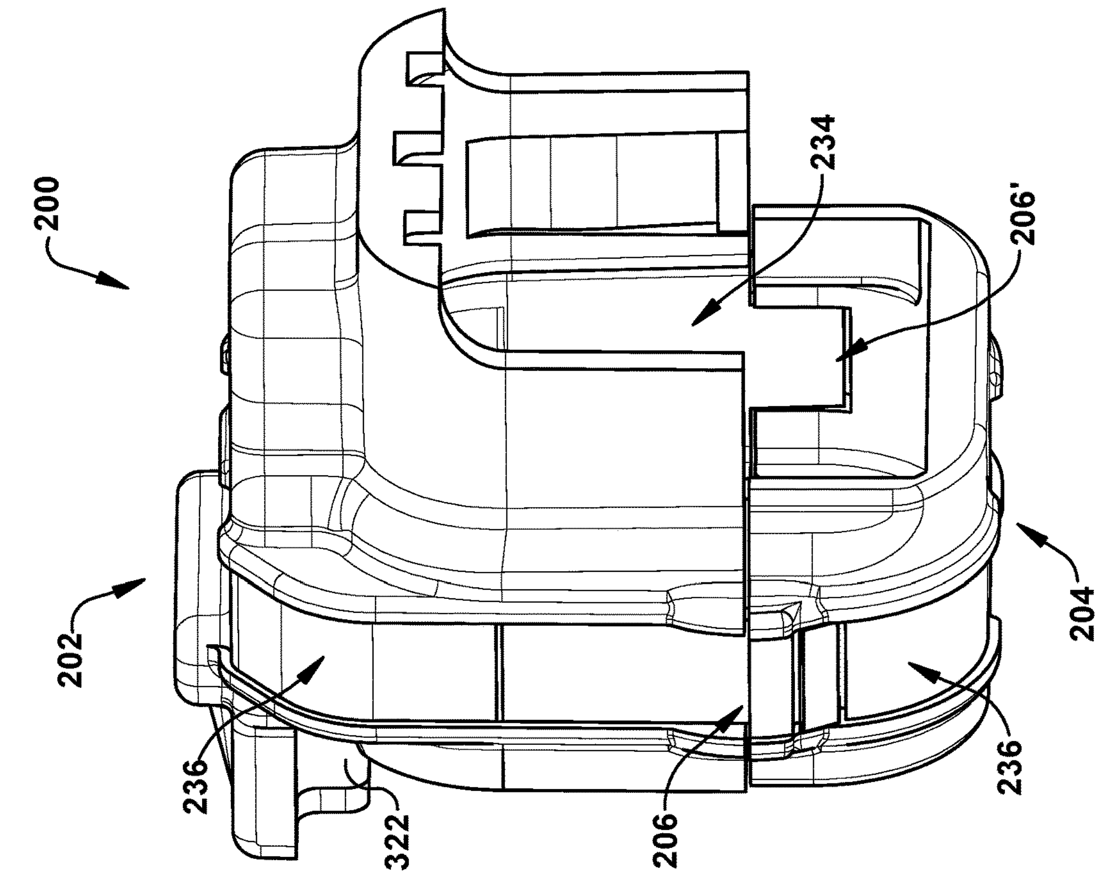
Figure 2E:
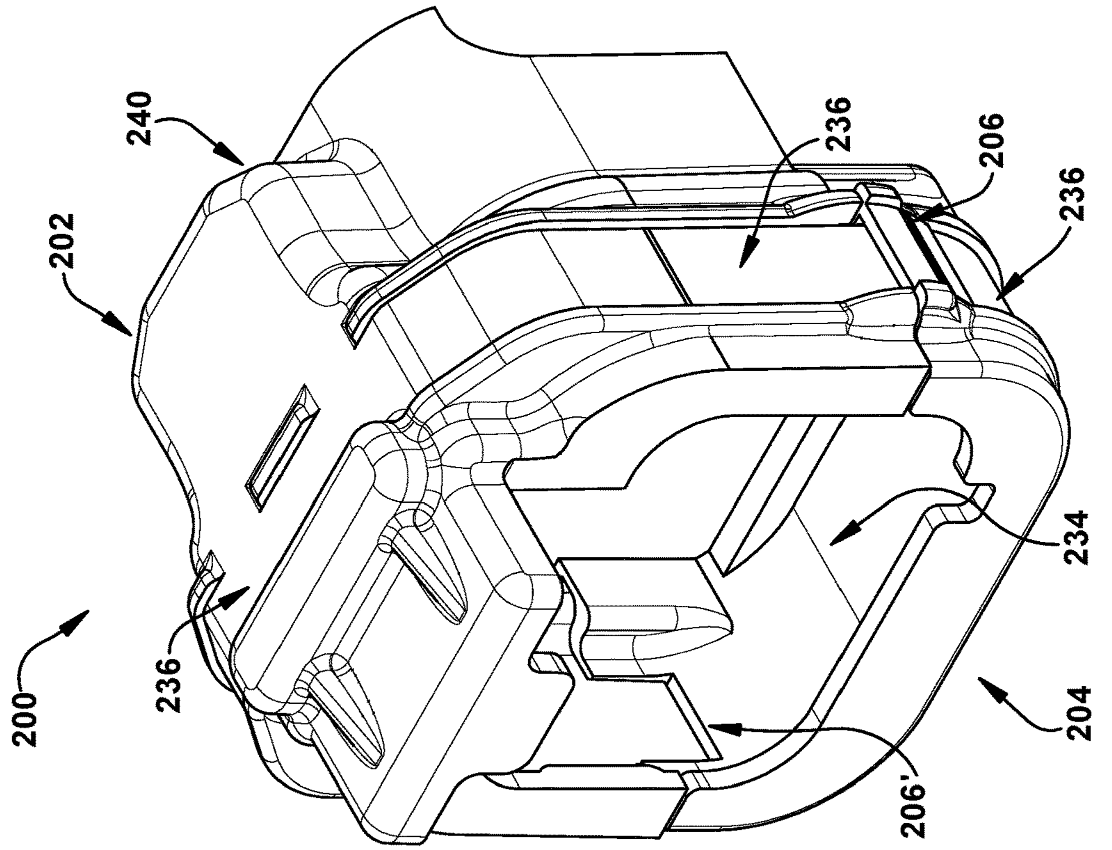

FIGS. 2A, 2B, 2C, 2D, 2E and 2F are component diagrams illustrating various views of one or more portions of an example vibration mitigation device 200, such as a connector cap. FIGS. 2A-2D show the vibration mitigation device 200 in a separated configuration (e.g., exploded view), and FIGS. 2E and 2F show the vibration mitigation device 200 in a coupled configuration. FIG. 2A shows the example device 200 from a top, front perspective view; FIG. 2B from a front view; FIG. 2C from a rear view; FIG. 2D from a first side view (the second side is similar in reverse); FIG. 2E from a front, top perspective view; and FIG. 2F from a rear, perspective view. In this example implementation, the vibration mitigation device 200 can comprise a shell 240, that is made up of a first shell section 202 (e.g., upper shell) and a second shell section 204 (e.g., lower shell). The first shell section 202 and second shell section 204 can be selectably, fixedly coupled to each other using a coupled connector latch assembly 206, 206', which can be disposed on opposing sides of the vibration mitigation device 200. That is, for example, when the upper (first) and lower (second) shells 202, 204 are joined together around a target, assembled wiring connector-component connector/connector block, they can form a protective shell 240 that is joined in a fixed engagement using the coupled connector latch assembly 206, 206', and, in some implementations described below, a hinge.

As further described below, in some implementations, when coupled together, the respective shell sections 202, 204 can form a hollow body 234 that is configured to receive a combined wiring connector and component connector (e.g., 104, 106 of FIG. 1, 658, 662 of FIG. 6A), and operably hold them together to mitigate vibration, for example. As an example, the hollow body 234 can be configured to receive a target wiring connector and component connector that are operably coupled, engaged or otherwise joined together, such as a wiring connector that is coupled with and EGR valve, or connector coupled with a vacuum sensor, etc. That is, in different implementations, the hollow body 234 may be formed to appropriately receive the target connectors when connected, such that the target connection is held firmly to mitigate vibration between the respective connectors. As such, for example, different hollow bodies 234 may comprise different shapes and/or sizes that are configured to accommodate their target connectors.

Further, in some implementations, the example vibration mitigation device 200 can comprise a guide channel 234, which may be formed by one or more ribs (described below) disposed on an outer surface of the device 200. As an example, a type of tie-down strap (e.g., zip-tie, strap, clamp, elastic-polymer band, etc.) can be operably placed in the guide channel 234 after the upper shell 202 and lower shell 204 are coupled together around the engaged wiring coupler and component coupler. In this way, a biasing force can be applied around the periphery of the device 200 to help hold it in place during operation. That is, for example, vibration, shock, and general vehicle movement may provide for dislodging of the coupled connector latch assembly 206, 206'. In this example, the tie-down can apply an inwardly directed biasing force to help keep the top and bottom shells 202, 204 in place, and mitigated uncoupling.

Figure 3B:
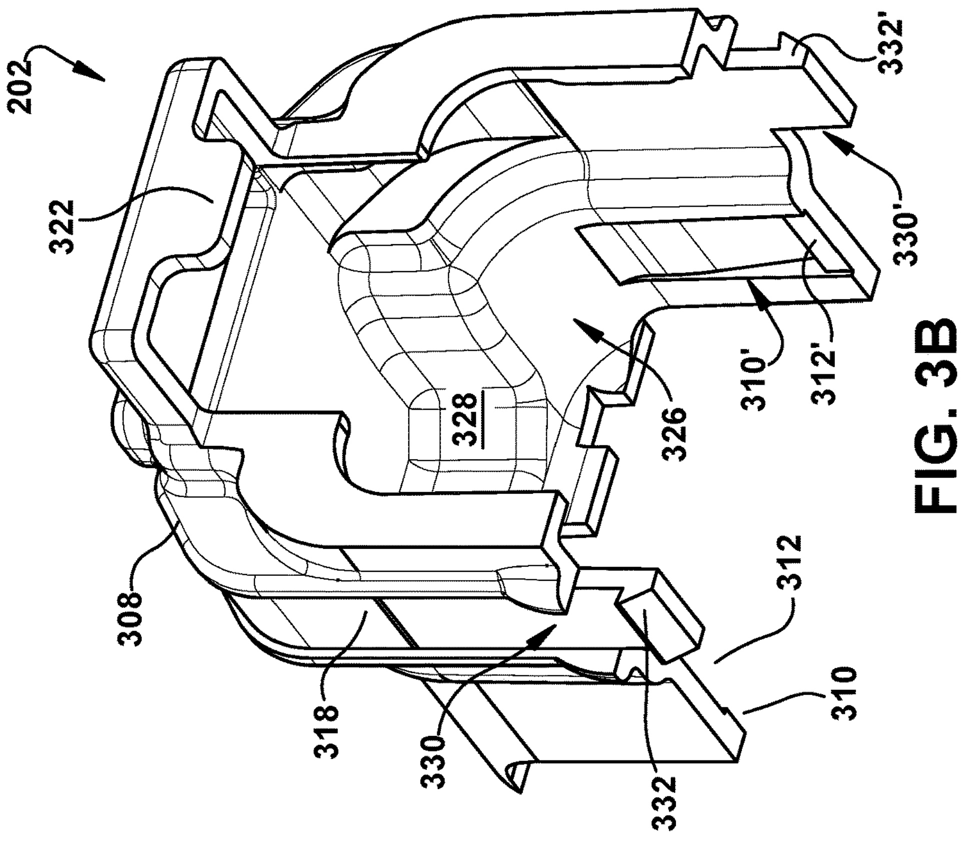
FIGS. 3A, 3B, 3C, and 3D are component diagrams illustrating various views of one implementation of at least a portion of the vibration mitigating connector cap, as described herein.
Figure 3A:
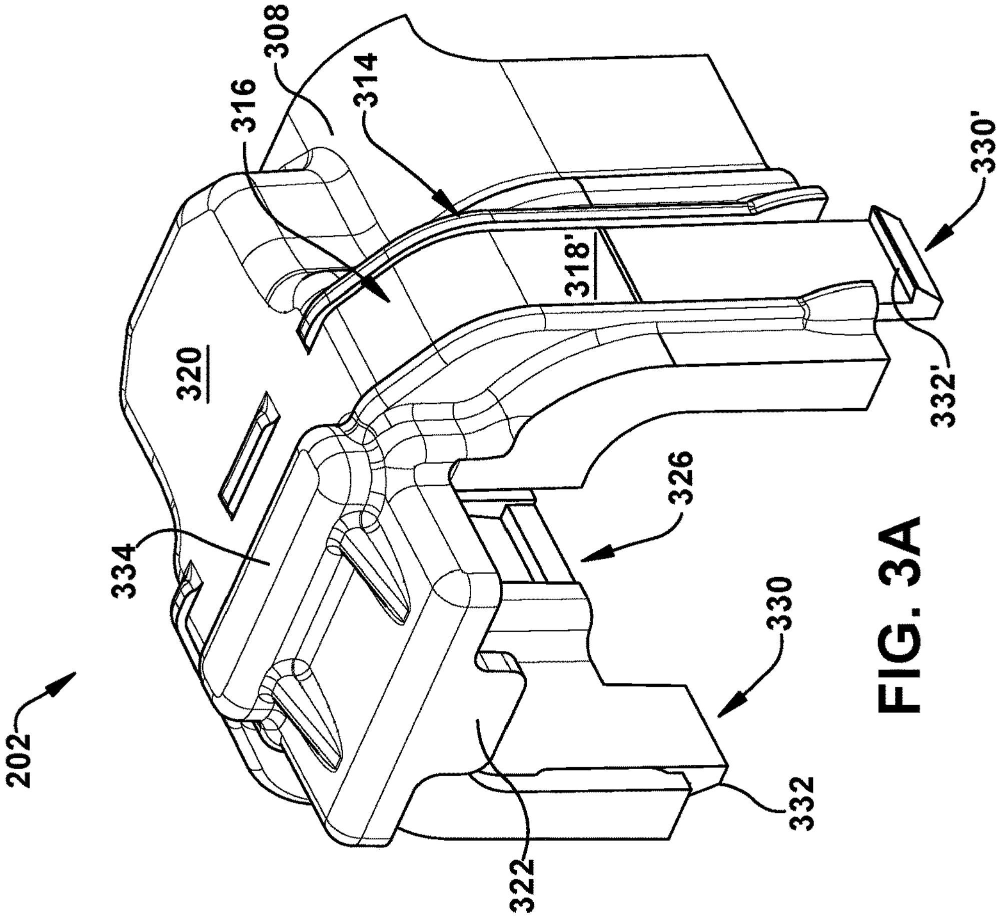
Figure 3D:
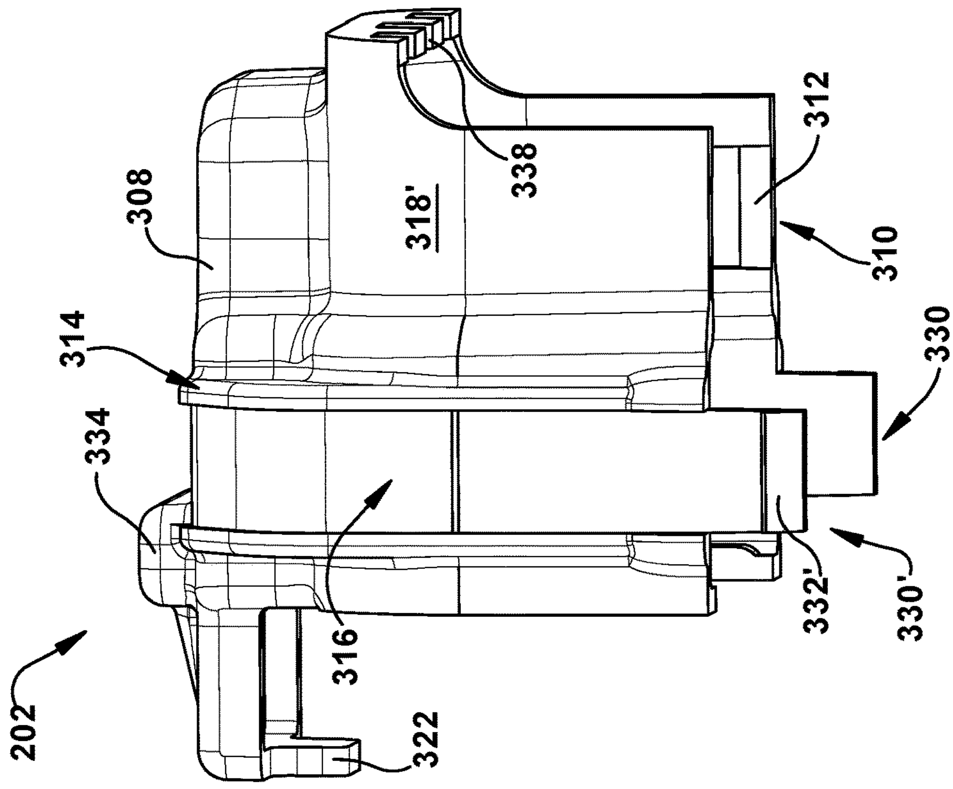
Figure 3C:
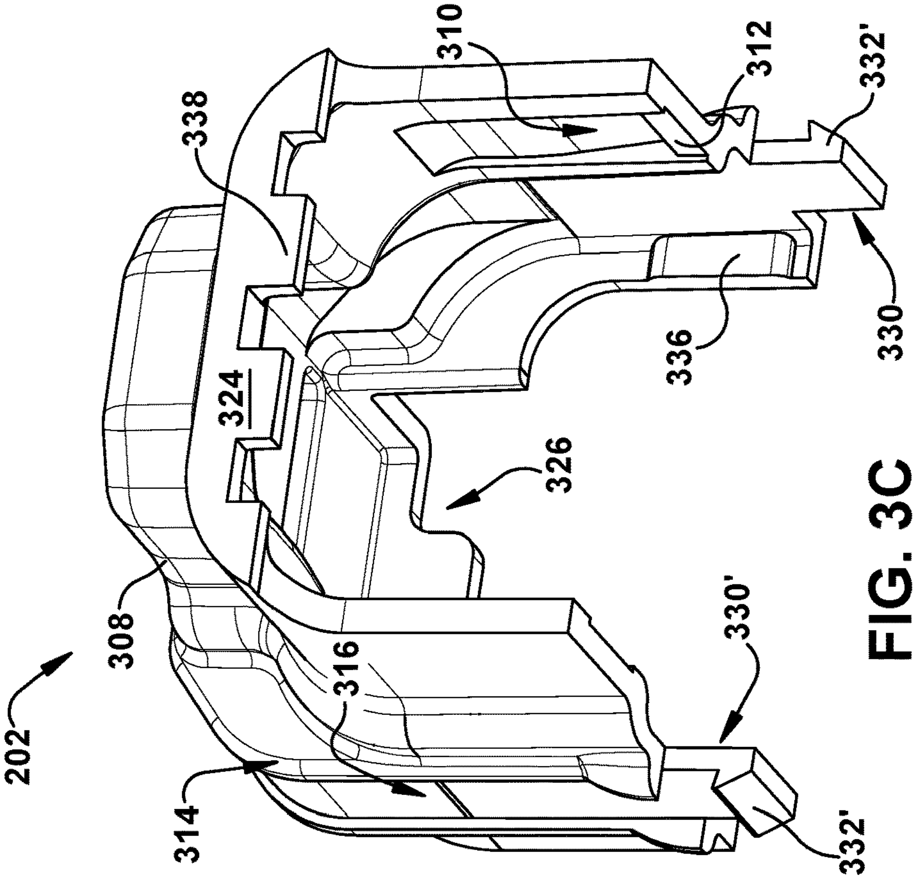
Figure 4B:
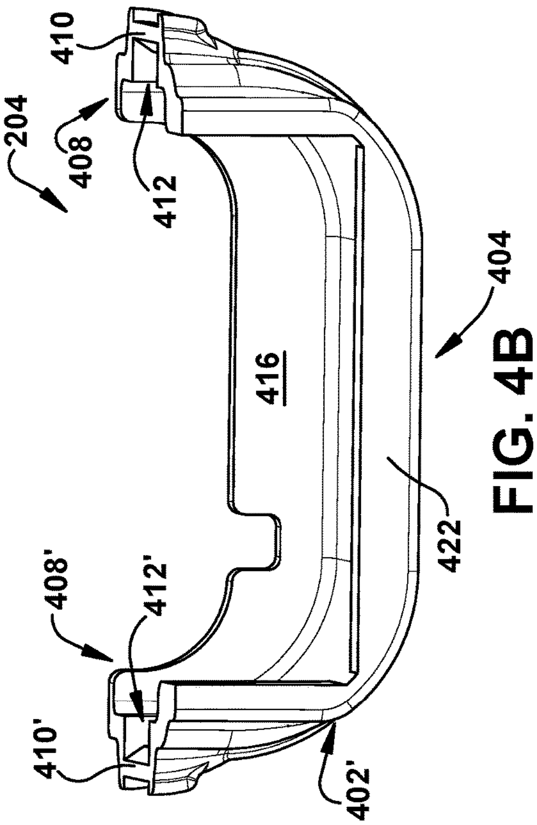
FIGS. 4A, 4B, 4C, and 4D are component diagrams illustrating various views of one implementation of at least another portion of the vibration mitigating connector cap, as described herein.
Figure 4D:
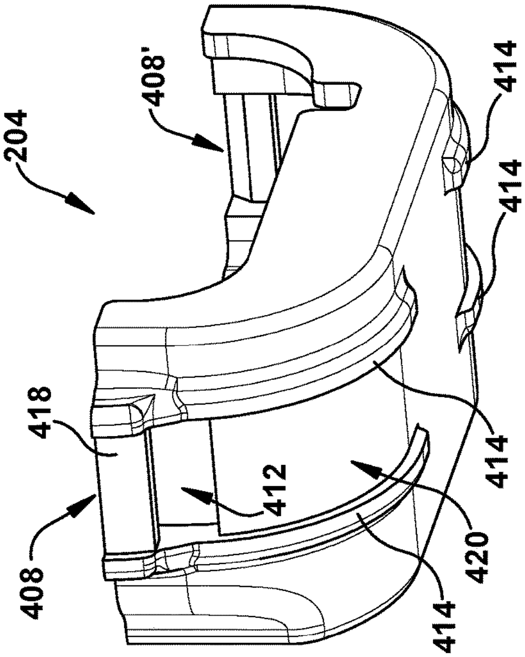
Figure 4A:
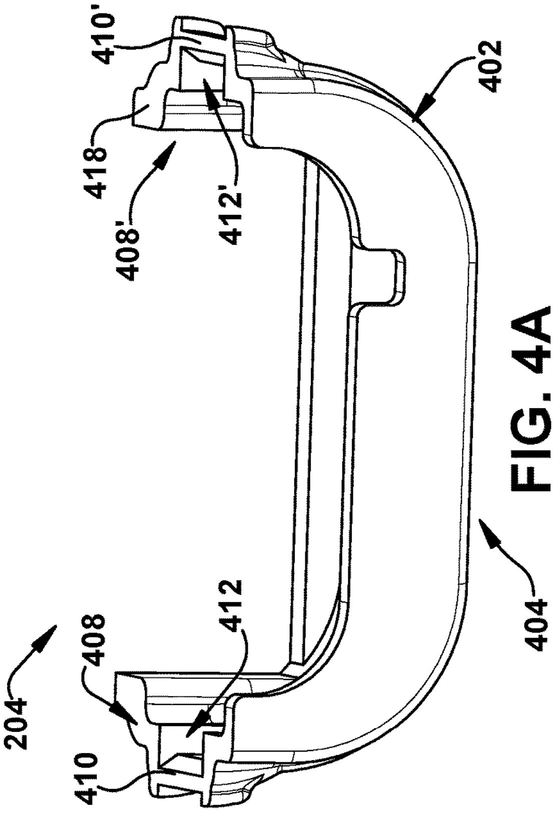
Figure 4C:
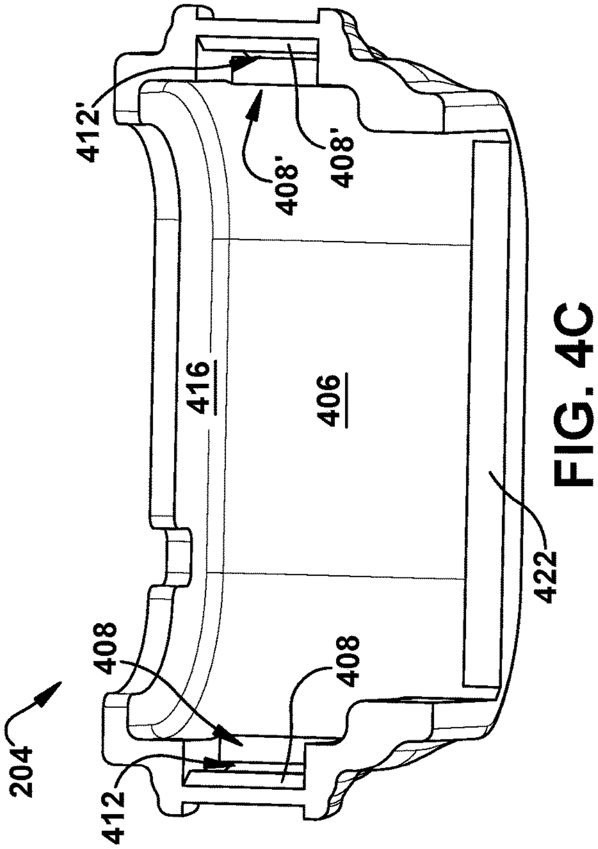

FIGS. 3A-D illustrate one example implementation of the first shell section or upper shell 202. FIG. 3A show a top, front perspective view; 3B a front, bottom perspective view; 3C a rear bottom perspective view; and 3D a side view. In this example implementation, the upper shell 202 can comprise an upper shell body, that is formed (e.g., sized and shaped) to operably fit over (e.g., and enclose in a complementary manner) a top or upper portion of a coupled wiring connector and component connector. That is, for example, an inner portion 326 is configured in size and shape to enclose a first portion of the wiring connector and component connector when they are appropriately, operably (e.g., when used in typical operation) connected.

In this implementation, the example upper (first) shell 202 can comprise one or more component (first) latch assemblies 310, 310' (e.g., a first latch assembly). In this example, a first component latch assembly 310 can be disposed on a first side, and a second component latch assembly 310' can be disposed on a second side. However, it is anticipated that in other configurations there may be merely one, or three or more, depending on the configuration, shape, and size of the component to which the shell 202 is engaging. The one or more component latch assembly arms (first latch assembly) 310, 310' can be configured (e.g., in shape, size, conformity, etc.) to operably engage in a fixed engagement with a portion of a target component (e.g., of a vehicle on which the component is disposed). That is, for example, respective component latch assemblies 310, 310' can comprise a component latch 312, 312' that operably engages with a complementary latch or similar portion of the target component to hold the upper shell 202 in place when installed. For example, the respective component latch assemblies 310, 310' can be formed from a semi-rigid (e.g., semi-flexible) material, such as a polymer, resin, combination, or similar material, that allows the assemblies 310, 310' to deflect or deform such that it fits around the target component latch during installation, and return to its original position upon proper installation, allowing the component latch 312, 312' to provide a stop against the portion (e.g., latch) of the component, to mitigate removal.

As described above, the example vibration mitigation device 200 can comprise a guide channel 236. In this implementation, the upper shell 202 can comprise an upper guide channel 316, which comprise the upper portion of the guide channel 236. As illustrated, for example, the upper guide channel 316 can be comprised of an area of the surface that is defined by a pair of ridges, walls, or ribs that run on either side of the channel 316. In other implementations, the channel 316 can comprise a cut-out portion in the surface of the upper shell 202 that forms a channel disposed below the surface of the upper shell 202. As illustrated, for example, the upper channel 316 can comprise ridges disposed on respective side walls 318, 318' and a top wall 320. In this example, the ridges can be used to operably mitigate movement of a tie-down outside of the channel 316, thereby keeping the tie-down in a desired location for appropriately holding the device 200 in place during use.

In some implementations, an internal portion 326 of the upper shell 202 can comprise upper tensioning ribs 336. As an example, the upper tensioning ribs 336 can be made up of one or more ribs that project inwardly from an interior wall 328 portion of a rear wall 324. In some implementations, the one or more upper tensioning ribs 336 can form a taper (e.g., narrow down) from a first end to a second end (e.g., from their top end to their bottom end). That is, for example, the internal portion 326 of the upper shell 202 comprises an open end and a closed end. In this implementation, the one or more upper tensioning ribs 336 can be tapered from the closed end toward the open end of the internal portion 326. In this way, for example, when the upper shell 202 is operably disposed on (e.g., slid onto/over) the combined component connector housing 104 and wiring harness connector 106, the taper of the tensioning ribs 336 can provide a biasing force against the coupled connectors. As an example, the biasing force provided by the tensioning ribs 336 can create a tension between the shell and the connectors (e.g., as a compressive force) that stabilizes the connector coupling during operation (e.g., helps hold in place against each other), and can help mitigate vibration between the connectors. In this way, the force of the coupling between the connectors can be increased, and operational movement between the connectors, with respect to each other, can be mitigated.

In some implementations, the upper shell 202 can comprise one or more upper (second) latch assemblies 330, 330', which can be configured to operably engage with the lower shell 204 in a selectably fixed engagement. The upper or second latch assemblies 330, 330' can be disposed on opposing sides (e.g. or merely one latch assembly may be disposed on one side), and can respectively comprise an upper latch 332, 332'. The upper latch 332, 332' can be configured to operably engage with a complementary latch portion on the lower shell 204, to allow for selectable engagement and disengagement from the lower shell 204. As an example, the upper shell 202 can be formed from a (at least partially) flexible material, such as a polymer-based material, that allows the upper latch 332, 332' to flex away from its default (e.g., normal) position during engagement, to subsequently substantially return back to its default position once engaged with the lower shell 204.

In some implementations, as illustrated, the upper (first) shell 202 can comprise one or more support ribs 314. The support rib(s) 314 can be appropriately disposed at portions of the upper shell 202 that may be subject to defection, torsion, or otherwise be misshapen during installation, removal, and/or use. As an example, as illustrated, support rib(s) 314 can be provided on and around the upper or second latch assembly 310, 310' to mitigate damage, provide reinforcement, and improve biasing force back to normal, during installation onto, use on, and removal from the component connector/connector block. That is, for example, the respective upper or second latch assemblies 310, 310' may need to be deflected from normal during installation in order to get the component latch 312, 312' around the connector, and into position. In this example, support rib(s) 314 can provide additional support (e.g., due to increased thickness and/or direction of rib) in locations where the deflection of the material may occur.

As illustrated, in some implementations, the upper shell 202 can comprise a connector latch cover 322 that is configured to operably engage with a portion of the wiring connector to hold the upper shell 202 in place, and/or to cover a latch assembly on the wiring connector, such that it mitigates use of the latch assembly when operably engaged as further described below. Further, the upper shell 202 can comprise one or more upper rear projections 338 that are configured to operably engage with a portion of the component block to hold the upper shell 202 in place. As an example, one or more portions of the upper shell 202 may comprise one or more projections and/or features that are configured to engage one or more portions of the coupled wiring connector and component block to facilitate holding the shell 200 in place during operations. Additionally, in some implementations, as illustrated, the upper shell 202 can comprise a top connector latch cover 334. In this implementation, the top connector latch cover 334 can be configured to firmly cover and operably hold a wiring connector latch assembly in place, for example, to mitigate uncoupling of the connector from the component block, and to mitigate vibration.

FIGS. 4A, 4B, 4C, and 4D are component diagrams that illustrate various views of one implementation of a second shell section, or lower shell 204 of a wiring connector protection device 200. In this implementation, the lower shell 204 can comprise a second shell body 418 that comprises side walls 402, 402', and a bottom wall 404. Internally, the second shell body 418 of the lower shell 204 can comprise a lower interior wall 406, one or more interior side walls and a front wall 416. Further, the interior of the second shell body 418 can be configured (e.g., shaped and/or sized) to operably (at least partially) enclose or house a lower portion of a component connector housing (e.g., 104 of FIG. 1B) coupled with a wiring harness connector (e.g., 106 of FIG. 1B) in a substantially form fitting manner. In this way, for example, when engaged with the upper shell 202, the lower shell 204 can help to operably hold the coupled connectors together, protect the coupled connectors from contaminants, and can help to mitigate vibration between the connectors (e.g., 104 and 106).

Additionally, the lower shell 204 can comprise at least one lower latch assembly 408, 408' (e.g., third latch assembly) that is configured to operably engage with the upper latch assembly 330, 330' (e.g., a second latch assembly) to selectably, fixedly hold the upper and lower shells 202, 204 together. In some implementations, the one or more lower latch assemblies 408, 408' can respectively comprise a lower latch 410, 410'. The lower latch 410, 410' can be configured to operably engage with a complementary upper latch 332, 332', in a selectably fixed engagement. That is, for example, the lower latch 410, 410' can comprise a stop or ridge that can operably receive the upper latch 332, 332', such that a ridge portion of the upper latch 332, 332' fits over a ridge portion of the lower latch 410, 410'. In one implementation, the lower latch assembly or third latch assembly 408, 408' can comprise a lower latch opening access 412, 412' that is configured to receive the upper latch 332, 332', such that the upper latch 332, 332' can operably engage the lower latch 410, 410'. In another implementation, the upper latch assembly or second latch assembly 330, 330' can comprise a latch opening access that allows a lower latch to flex and engage with a stationary upper latch (e.g., opposite of what is illustrated).

It should be appreciated that one or more complementary latch assemblies may be used to operably hold the lower and upper shells together to form the wiring connector protection device. For example, the upper and lower shells may be coupled together by a hinge at one side, and respectively comprise complementary latch assemblies at another side. In this example, the shells can be selectably engaged together by the one latch assembly at the one side, and the hinge at the other. Further, for example, three or more latch assemblies may be used in order to accommodate different sized electrical connectors, configurations, and applications.

In some implementations, the vibration mitigation device can comprise two parts that are selectably detachable at least along a first side that divides the device into two shells. In this implementation, the example vibration mitigation device can comprise a first and second shell. In this implementation, the vibration mitigation device can comprise a hinge that couples the two shells along a first side opposing a second side, which comprises complementary latch assemblies. The hinge allows for the two parts to selectably detach at the second side, and remain coupled at the first side. The latch assembly can selectably couples the two parts together at the second side. For example the latch can be unlatched to detach the first and second shells, and relatched to couple them together.

As illustrated in FIGS. 4A-4D, the example lower shell 204 can comprise one or more lower support ribs 414. Similarly to the upper support ribs 314 described above, the lower support ribs 414 can be appropriately disposed at portions of the lower shell 204 that may be subject to defection, torsion, impact, or otherwise be misshapen or impacted during installation, removal, and/or use. As an example, as illustrated, support rib(s) 414 can be provided on the portion of the lower shell where the side wall 402, 402' meets the bottom wall 404. In this example, this portion of the second shell body 418 may be subjected to flexion during installation/removal, and/or impact during use. The rib(s) 414 can help mitigate damage, provide reinforcement, and improve biasing force back to normal, during installation onto, use on, and removal from the component connector. That is, for example, the second shell body 418 may need to be deflected from normal during installation in order to get the second shell 204 around the connector, and into position. In this example, the support rib(s) 414 can provide additional support (e.g., due to increased thickness and/or direction of rib) in locations where the deflection of the material may occur.

Additionally, the lower shell 204 can comprise a lower guide channel 420. As an example, the lower guide channel 420 can comprise one or more ridges or raised portions on either side of the channel to act as walls or boundaries to help keep a tie-down in the desired location. As described above, a tie-down (e.g., zip tie, strap, cord, etc.) may be engaged around the vibration mitigation device upon installation around a target connection. In this example, the tie-down can help keep the upper and lower shells together during use, and can also help apply a compression force around the coupled connectors to help mitigate vibration during operation. In this implementation, the lower guide channel 420 can help to keep the tie-down in the desired location on the lower shell, which may be one that provides for a better application of compression to the device.

In some implementations, as illustrated, the lower shell, or second shell section 204 can comprise a lower component web locking feature 422. As described above, with regard to the connector latch cover 322 and upper rear projections 338, the lower component web locking feature 422 can be configured to operably engage with a portion of the component connector block (e.g., or the wiring connector), to operably hold the lower shell 204 in place during operation. Further, the front wall 416 of the lower component 204 can be configured to engage with a portion of the wiring connector to operably hold the lower shell 204 in place during operation. As an example, the lower shell 204 can comprise one or more other feature or projections that operably couple with one or more portions of the coupled wiring connector and component block to help hold the coupling together during operation.

Figure 5A:
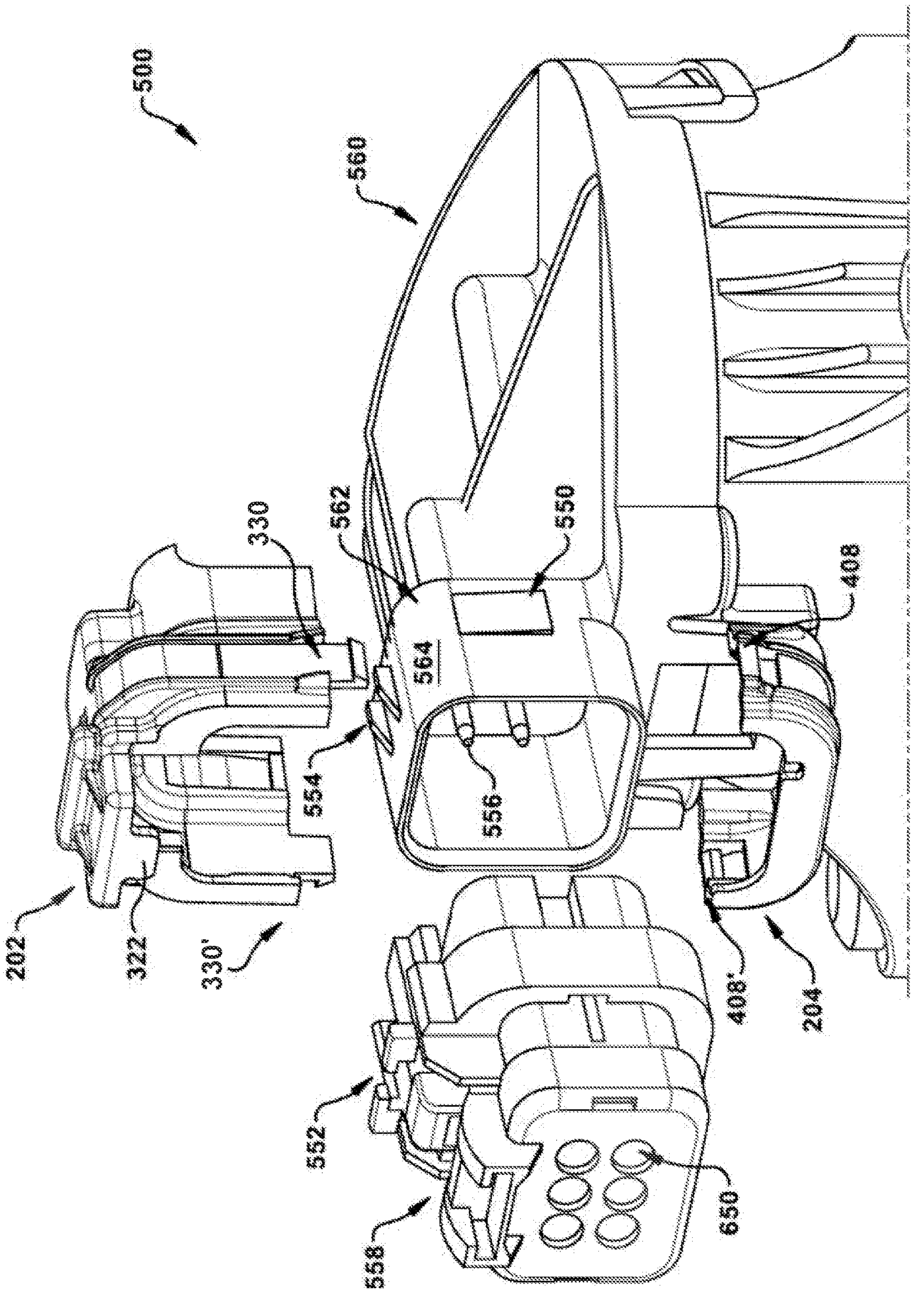
FIGS. 5A, 5B, and 5C are component diagrams illustrating various views of the vibration mitigating connector cap as an example implementation, as described herein.
Figure 5C:
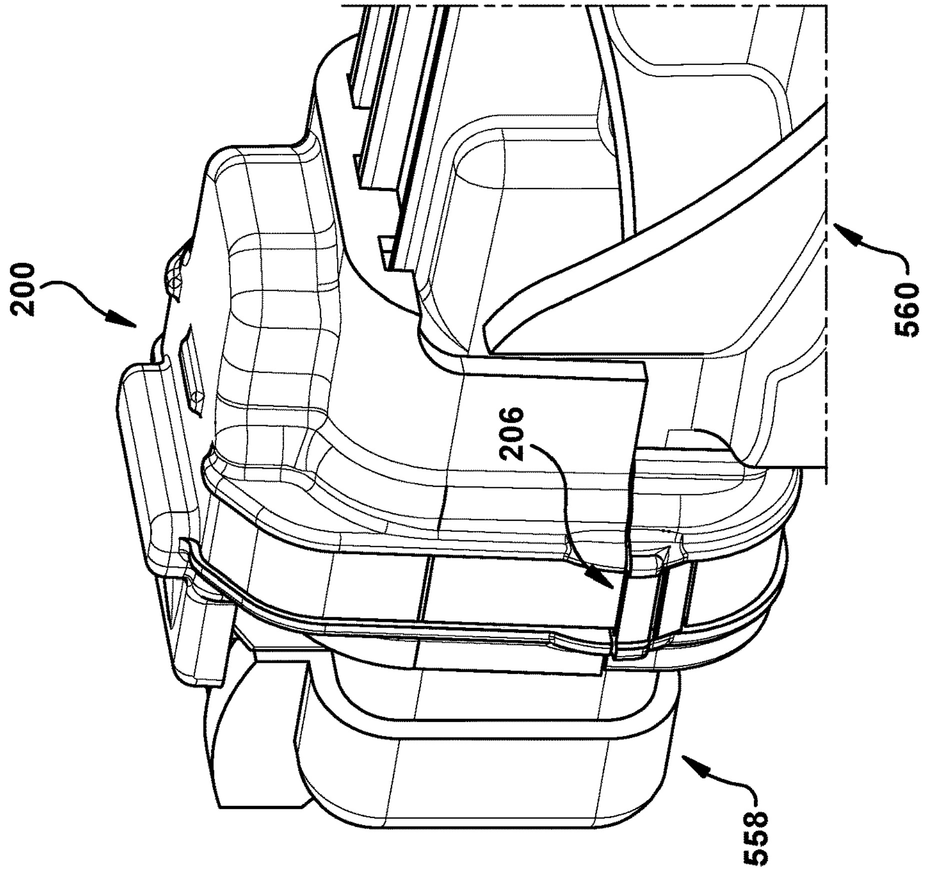
Figure 5B:
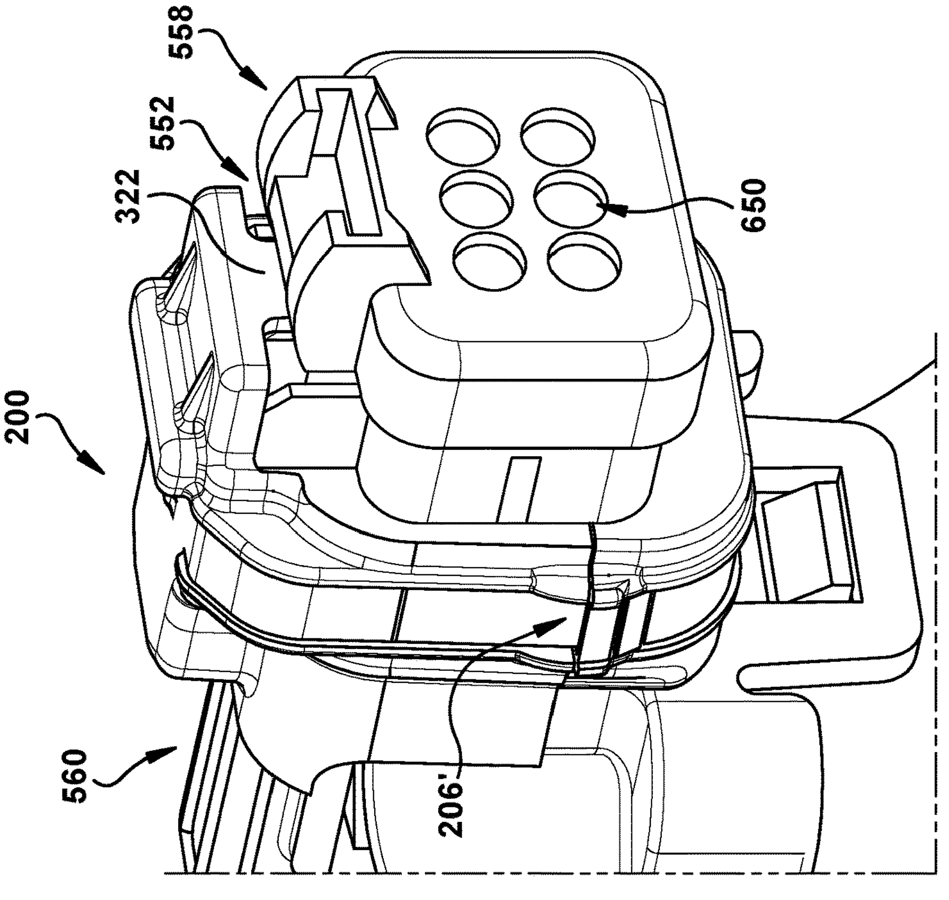

FIGS. 5A, 5B, and 5C are component diagrams that illustrates an example of an implementation 500 of the vibration mitigation device 200 that can be used on coupled electrical/communication connectors. In this example implementation 500, a vehicle can comprise a vehicle component 560, such as an exhaust gas recirculation (EGR) valve. The component 560 can comprise a component connector 562, such as a connector block, which comprises connector housing 564, connector pins 556 (e.g., or other electrical couplers), and a component connector latch assembly 554. Further, a wiring harness can be electrically/communicatively coupled to the component using a wiring harness connector 558. In this example, the wiring harness connector 558 can comprise a latch assembly 552 that is complementary to the connector latch assembly 554, such that the two assemblies 552, 554 can be selectably engaged with each other to engage the wiring harness to the component 560.

Further, in this implementation, the component connector block 562 can comprise a component upper latch feature 550. The component upper latch feature 550 comprises a latch, stop, or other feature that is configured to engage the component first latch (e.g., 312 of FIG. 3) of the component first latch assembly 310. Further, in some implementations, a second component upper latch feature 550 can be disposed on the other side of the component connector block 562, for engaging with another component first latch (e.g., 312' of FIG. 3) of the component first latch assembly 310'. In this way, for example, the upper shell/first shell section can be operably engaged with the component connector block 562 in a selectably fixed arrangement. For example, the vibration protection device 200 can operably hold the wiring harness connector 558 and component connector 562 together firmly, while mitigating vibration at the connection, which can help mitigate damage to connecting pins, etc. Additionally, a tie-down (not shown—e.g., strap, zip-tie, etc.) may be firmly wrapped around the engaged upper and lower shells 502, 504, using the guide channels (e.g., 236, 316, 420) to provide additional compression to mitigate vibration and improve the firmness of the connection.

With continued reference to FIGS. 2, 3, 4, and 5A, FIGS. 6A and 6B provide a front and rear perspective view of the device 200 in an operable position, engaged with the coupled wiring connector 558 and the component connector block 562, of the component 560. In this implementation, the lower shell 204 can be engaged with the upper shell in a coupled latch assembly 206, 206', at the upper and lower latches 310, 310', 408, 408'. In this way, in this example, the engaged upper and lower shells 502, 504 can be operably engaged with the component 560. Further, as illustrated, the wiring harness connector 558 can comprise wiring harness connection points 650. In this example, the wiring harness connection points 650 can be the location where wires from the wiring harness are connected to the wiring harness connector 558.

Additionally, the upper shell 202 comprises the connector latch cover 322. The connector latch cover 322 operably engages the wiring harness connector latch assembly 552, for example, by covering at least a portion of the wiring harness connector latch assembly 552 when operably engaged. As an example, the wiring harness connector latch assembly 552 can comprise a latch disengagement portion that, when activated, allows a user to disengage the wiring harness connector latch assembly 552 from the component housing connector latch assembly 554, such as to disengage the wiring harness connector 558 from the component connector block 562. In this implementation, the connector latch cover 322 can be disposed over the wiring harness connector latch assembly 552 to mitigate access to the latch assembly 552, and/or to mitigate operation of the disengagement portion (e.g., button, latch lever, arm, etc.).

Figure 6A:
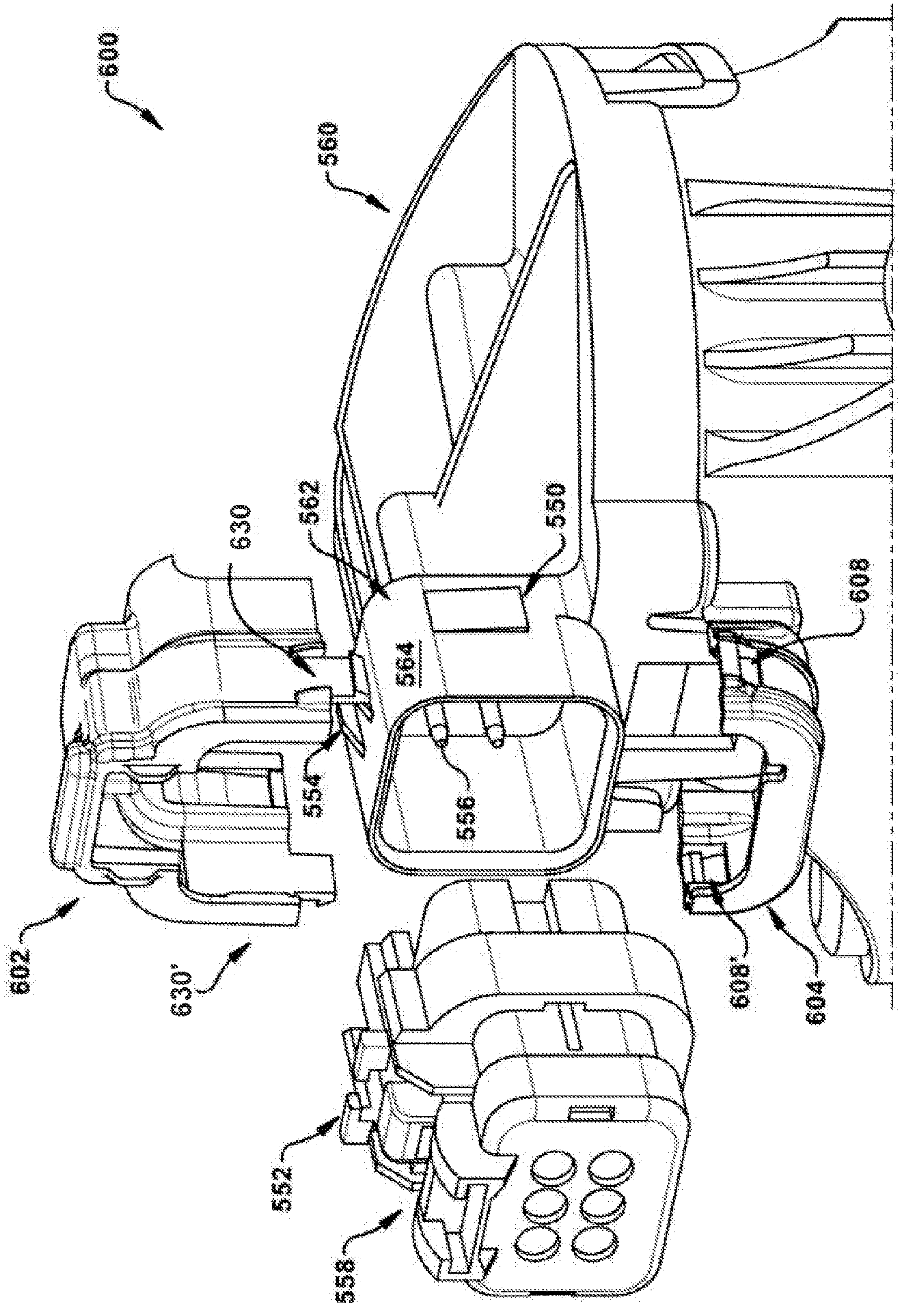
FIGS. 6A, 6B, and 6C are component diagrams illustrating various views of an alternate vibration mitigating connector cap as an example implementation, as described herein.
Figure 6C:
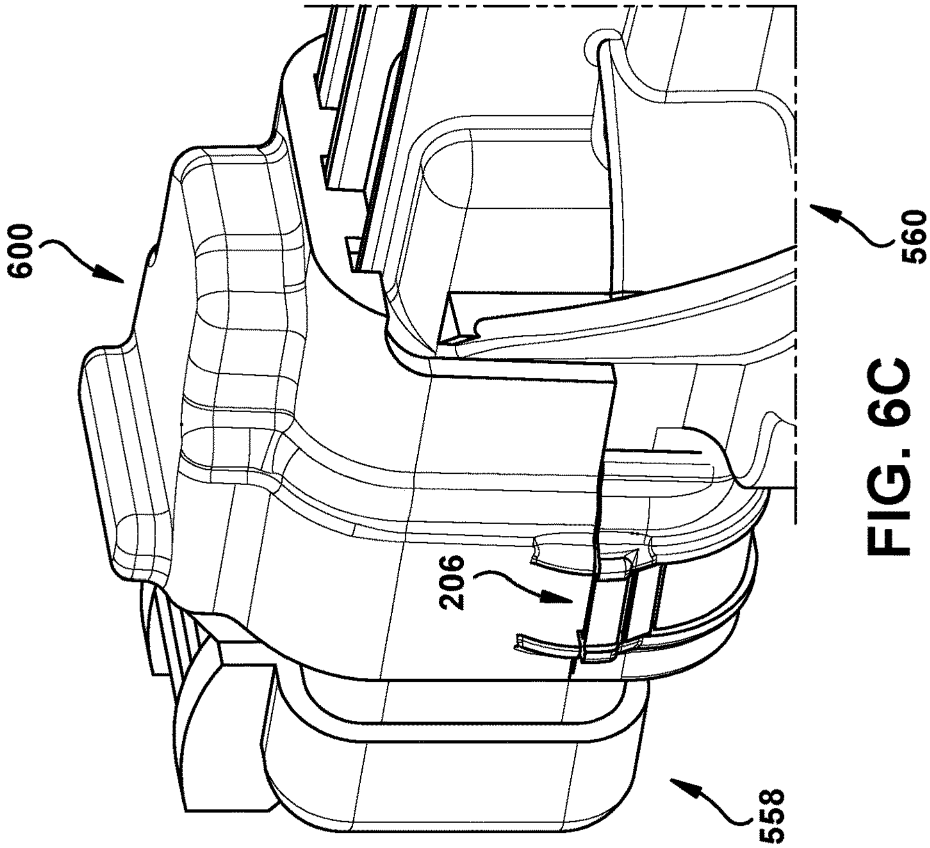
Figure 6B:
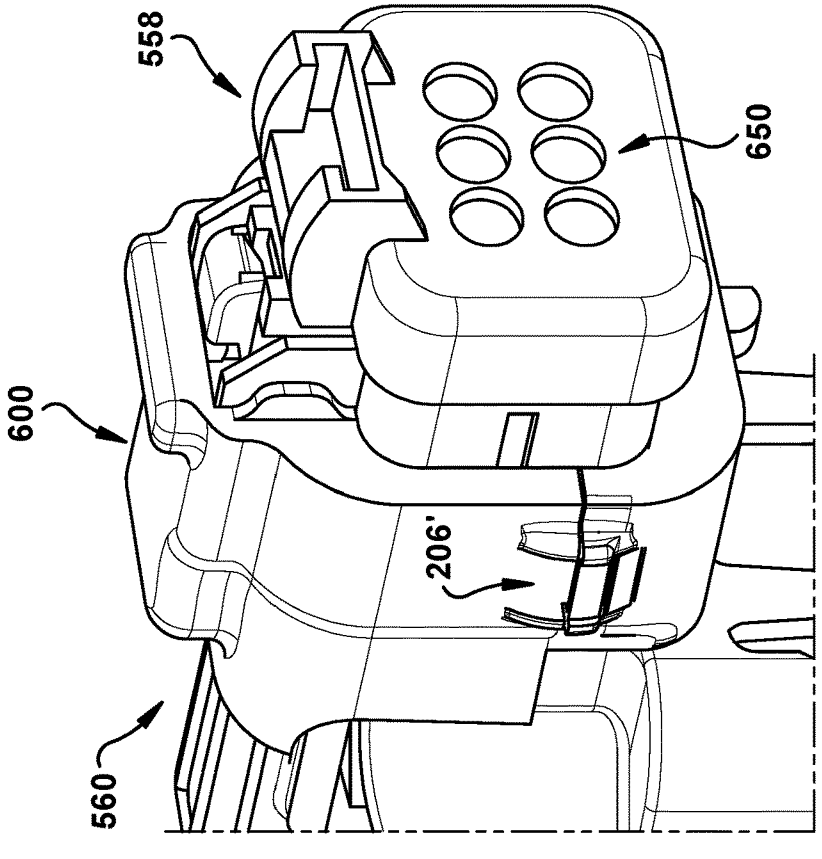

FIGS. 6A, 6B, and 6C are component diagrams illustrating one alternate implementation of an alternate vibration mitigation device 600. In this implementation, the component upper latch feature 550 comprises a latch, stop, or other feature that is configured to engage a component first latch of the component first latch assembly 610. Further, in some implementations, the second component upper latch feature 550 can be disposed on the other side of the component connector block 562, for engaging with another component first latch of the component first latch assembly 610'. In this way, for example, the upper shell/first shell section can be operably engaged with the component connector block 562 in a selectably fixed arrangement. For example, the alternate vibration protection device 600 can operably hold the wiring harness connector 558 and component connector 562 together firmly, while mitigating vibration at the connection, which can help mitigate damage to connecting pins, etc. Additionally, a tie-down (not shown—e.g., strap, zip-tie, etc.) may be firmly wrapped around the engaged upper and lower shells 502, 504, using the guide channels (e.g., 236, 316, 420) to provide additional compression to mitigate vibration and improve the firmness of the connection.

With continued reference to FIGS. 2, 3, 4, and 6A, FIGS. 6B and 6C provide a front and rear perspective view of the alternate device 600 in an operable position, engaged with the coupled wiring connector 558 and the component connector block 562, of the component 560. In this implementation, the lower shell 604 can be engaged with the upper shell in a coupled latch assembly (e.g., 206, 206' of FIG. 2, at the upper and lower latches 310, 310', 408, 408' in FIGS. 3 and 4). In this way, in this example, the engaged upper and lower shells 502, 504 can be operably engaged with the component 560. Further, as illustrated, the wiring harness connector 558 can comprise wiring harness connection points 650. In this example, the wiring harness connection points 650 can be the location where wires from the wiring harness are connected to the wiring harness connector 558.

Figure 7:
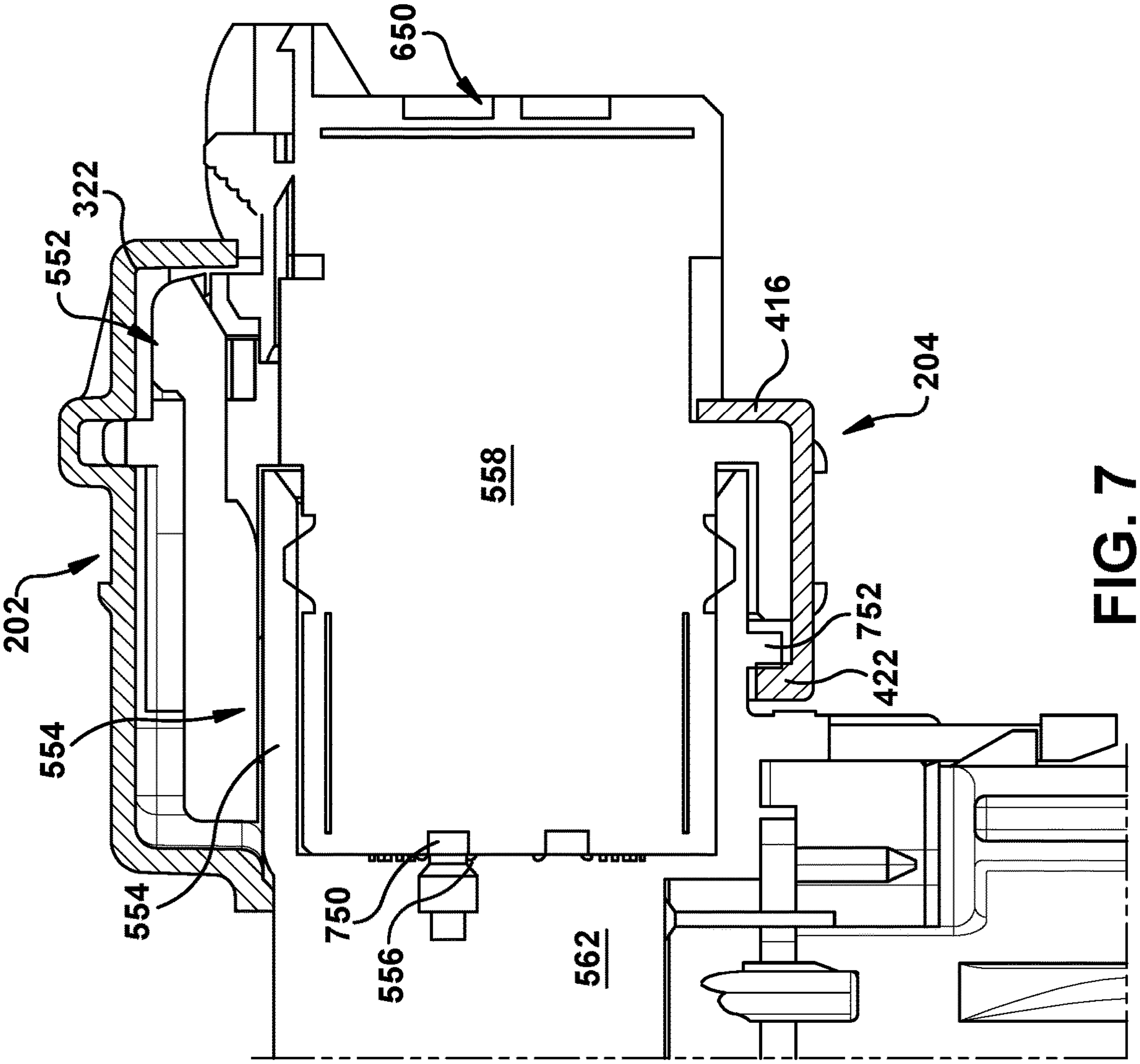
FIG. 7 is a component diagram illustrating a view of the vibration mitigating connector cap as an example implementation, as described herein.

With continued reference to the other FIGURES, FIG. 7 is a component diagram illustrating a cut-away view showing the right side of the vibration mitigation device 200 installed on the coupled wiring connector 558 and component connection block 562. In this example, the wiring connector 558 is operably engaged with the component connector block 562, where a portion of the wiring connector 558 is inserted into the connector block housing 554. Further, to provide for a selectably fixed engagement, the wiring harness connector latch assembly 552 is engaged with the component block latch assembly 554. Further, as illustrated, the top connector latch cover 322 is disposed over the wiring harness connector latch assembly 552 to mitigate detachment of the coupled latch assemblies 552, 554, by activating a detachment feature (e.g., button, lever, latch) on the connector latch assembly 552, and to provide a protective cover. Additionally, the lower component web locking feature 422 is operably engaged with a component block lower latch feature 752. As described above, the lower component web locking feature 422 can be configured to operably engage a feature of the component block 562 to help secure the lower shell 204 to the coupled connector 558 and block 562. In this implementation, the front wall 416 is engaged with the wiring connector 558, to provide for improved locking of the shell 200 in place during use.

As illustrated, the component connector pins 556 are operably engaged with complementary wiring harness connector pins receptacle 750. In this way, for example the wiring harness can be electrically/communicatively coupled with the component 660. Further, the example vibration mitigation device 200 can help to mitigate vibration between the connector 558 and the block 562, which also reduces vibration between the connector pins 556 and the connector pins receptacles 750. The connection between the connector pins 556 and the connector pins receptacles 750 can often be a location of damage resulting from excess vibration, due to fretting of the pins, damage to the pins, and damage to the connection points. Therefore, reducing vibration by using the example device 200 can improve the life of and reduce maintenance for the connectors 558, 562.

Figure 8:
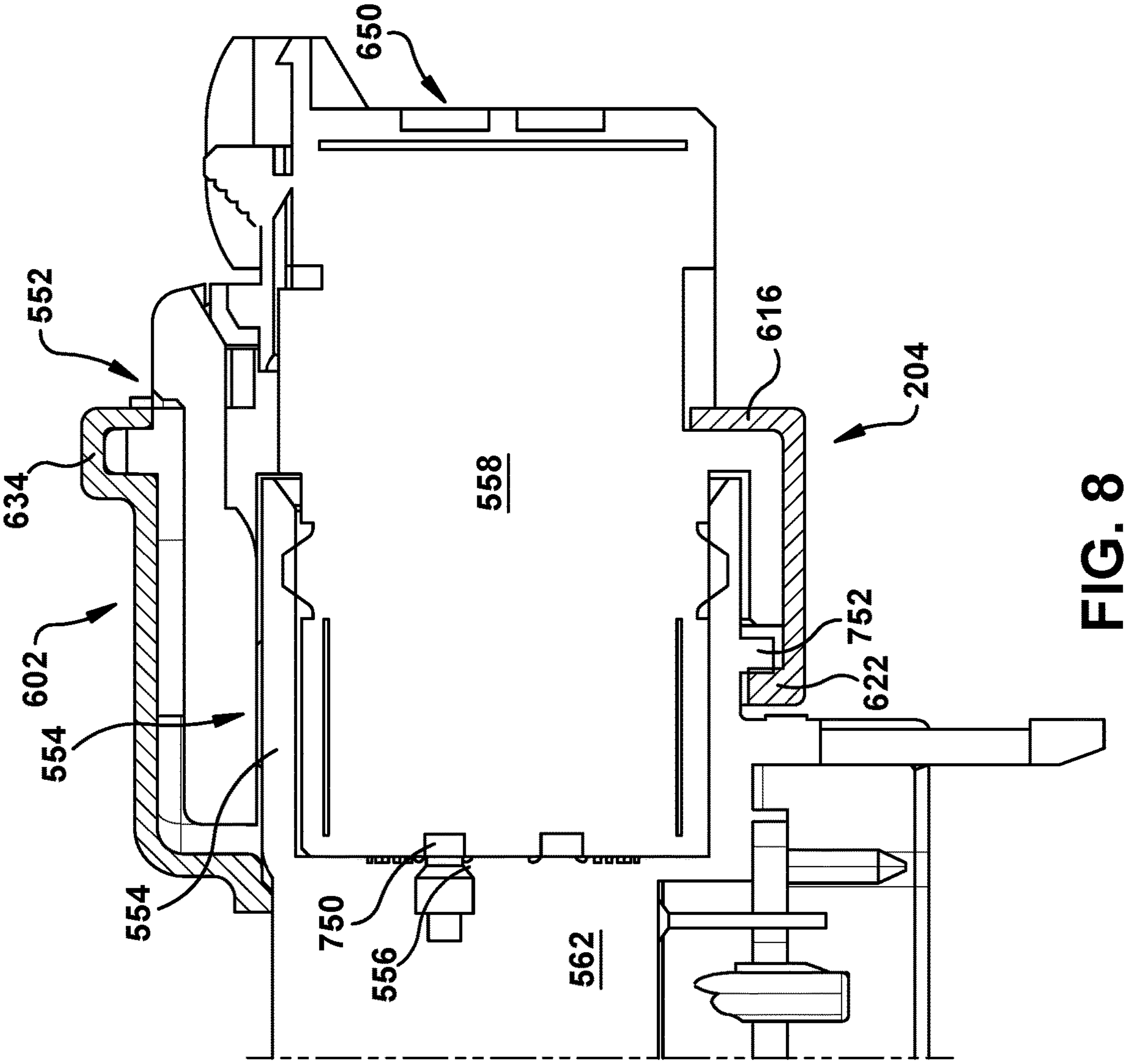
FIG. 8 is a component diagram illustrating a view of the alternate vibration mitigating connector cap as an example implementation, as described herein.

With continued reference to the other FIGURES, FIG. 8 is a component diagram illustrating a cut-away view showing the right side of the alternate vibration mitigation device 600 installed on the coupled wiring connector 558 and component connection block 562. In this example, the wiring connector 558 is operably engaged with the component connector block 562, where a portion of the wiring connector 558 is inserted into the connector block housing 554. Further, to provide for a selectably fixed engagement, the wiring harness connector latch assembly 552 is engaged with the component block latch assembly 554. Further, as illustrated, an alternate top connector latch cover 634 is disposed over the wiring harness connector latch assembly 552 to mitigate detachment of the coupled latch assemblies 552, 554, and to provide a protective cover. Additionally, the lower component web locking feature 622 is operably engaged with a component block lower latch feature 852. As described above, the lower component web locking feature 622 can be configured to operably engage a feature of the component block 562 to help secure the lower shell 604 to the coupled connector 558 and block 562. In this implementation, the front wall 616 is engaged with the wiring connector 558, to provide for improved locking of the shell 600 in place during use.

As illustrated, the component connector pins 556 are operably engaged with complementary wiring harness connector pins receptacle 750. In this way, for example the wiring harness can be electrically/communicatively coupled with the component 660. Further, the example, alternate vibration mitigation device 600 can help to mitigate vibration between the connector 558 and the block 562, which also reduces vibration between the connector pins 556 and the connector pins receptacles 750. The connection between the connector pins 556 and the connector pins receptacles 750 can often be a location of damage resulting from excess vibration, due to fretting of the pins, damage to the pins, and damage to the connection points. Therefore, reducing vibration by using the example device 600 can improve the life of and reduce maintenance for the connectors 558, 562.

The word “exemplary” is used herein to mean serving as an example, instance or illustration. Any aspect or design described herein as “exemplary” is not necessarily to be construed as advantageous over other aspects or designs. Rather, use of the word exemplary is intended to present concepts in a concrete fashion. As used in this application, the term “or” is intended to mean an inclusive “or” rather than an exclusive “or.” That is, unless specified otherwise, or clear from context, “X employs A or B” is intended to mean any of the natural inclusive permutations. That is, if X employs A; X employs B; or X employs both A and B, then “X employs A or B” is satisfied under any of the foregoing instances. Further, At least one of A and B and/or the like generally means A or B or both A and B. In addition, the articles “a” and “an” as used in this application and the appended claims may generally be construed to mean “one or more” unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms “includes,” “having,” “has,” “with,” or variants thereof are used in either the detailed description or the claims, such terms are intended to be inclusive in a manner similar to the term “comprising.”

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A device used to mitigate vibration in a wiring connection with a vehicle component, comprising:

a shell comprising two at least partially selectably separable sections forming a hollow body shaped to operably fit around a combination of a wiring connector coupled with a connector block in an engagement that mitigates movement of the wiring connector with respect to the connector block, the body comprising:

a first shell section that operably covers at least a first portion of the connector block and a portion of the wiring coupler, the first section comprising:

a first latch assembly that selectably latches onto at least a portion of the connector block engaged, to operably fixedly engage the first latch assembly with the connector block; and a second latch assembly; and a second shell section that operably covers at least a second portion of the coupled connector block wiring coupler to allow for selectably disposing the coupled wiring coupler and connector block inside the body, the second shell section comprising a third latch assembly that selectably engages the second latch assembly to operably, fixedly hold the coupled connector block and wiring coupler together in electrical engagement;

wherein the connector block is rigidly fixed to a housing of the vehicle component.

2. The device of claim 1, the shell section comprising one or more ribs raised from an inside wall of the body that operably contacts the connector block and/or the wiring connector.

3. The device of claim 2, the one or more ribs tapering in height from a first end to a second end.

4. The device of claim 1, the shell comprising a first guide channel disposed on an outside wall of the shell, the guide channel sized and shaped to operably hold a tie down band within the guide channel.

5. The device of claim 1, the first latch assembly comprising a latch disposed on an inside wall of the first shell section that is shaped to operably engage a complementary latch disposed on an outside wall of the connector block.

6. The device of claim 1, the shell comprising one or more reinforcing ribs disposed on an outside wall of the body at a location of operable flexing stress.

7. The device of claim 1, the second latch assembly comprising a latch that operably flexes away from a default position, and returns to the default position; and the third latch assembly comprising a ridge that operably flexes the latch away from the default position and receives the latch in the returned position to fixedly engage the second latch assembly with the third latch assembly.

8. The device of claim 1, the shell comprising a hinge on a first side and the second and third latch assemblies on a second side, the first and second shell separable at the second side while maintaining engagement with each other at the first side.

9. The device of claim 1, the shell comprising a pair of second latch assemblies on opposing sides, and a pair of third latch assemblies on opposing sides, and the shell first and second shells selectably separable from each other at the first and second sides.

10. The device of claim 1, the second shell section comprising a lower web locking feature comprising a rear wall portion that operably, fixedly engages a complementary portion of the connector block to hold the second shell section in a fixed position with the connector block.

11. The device of claim 10, the second shell section comprising a front wall that operably, fixedly engages a complementary portion of the wiring connector to hold the second shell section in a fixed position with the wiring connector.

12. The device of claim 1, the first shell section comprising one or more of:

a front protrusion feature that comprises a ridge protruding downward from a front of the first shell section, and which operably engages a complementary portion of the connector block to hold the first shell section in a fixed position with the connector block; and a rear protrusion feature that comprises a ridge protruding downward from a rear of the first shell section, and which operably engages a complementary portion of the wiring connector to hold the first shell section in a fixed position with the wiring connector.

13. A method of mitigating vibration between electrical couplings of a wiring connector and an engaged connector block, wherein the connector block is fixedly engaged with a housing of a vehicle component, the method comprising:

fitting a shell around the coupled wiring connector and the connector block, the shell comprising a first shell section and a second shell section that are at least partially selectably separable from each other and form a hollow body that is shaped to fit around the coupled wiring connector and connector block;

engaging a first latch assembly disposed on the first shell section with at least a portion of the connector block in a fixed engagement; and engaging a second latch assembly disposed on the first shell section with a third latch assembly disposed on the second shell section thereby disposing at least a portion of the coupled wiring connector and the connector block inside the hollow body to operably, fixedly hold the coupled connector block and wiring coupler together in electrical engagement.

14. The method of claim 13, wherein the shell comprises one or more ribs raised from an inside wall of the body, and wherein engaging the first shell section with the second shell section places the ribs in contact with the connector block and/or the wiring connector to provide a compressive force.

15. The method of claim 13, wherein the shell comprises a guide channel that is disposed on an outside wall of the shell, and the guide channel is sized and shaped to operably hold a tie down band within the guide channel, and the method further comprises engaging a tie-down strap in the channel that provides a compressive force to the shell.

16. The method of claim 13, wherein the first latch assembly comprises a latch disposed on an inside wall of the first shell section that is shaped to operably engage a complementary latch disposed on an outside wall of the connector block, and wherein the first latch assembly is operably, fixedly engaged with the component connector block.

17. The method of claim 13, wherein fitting a shell around the coupled wiring connector and connector block comprises:

fitting the first shell section over a top portion of the coupled wiring connector and connector block, and fixedly engaging the first latch assembly with connector block; and fitting the second shell section over a bottom portion of the coupled wiring connector and connector block and engaging the second latch assembly with the third latch assembly.

18. The method of claim 13, wherein fitting a shell around the coupled wiring connector and connector block comprises fixedly engaging a lower web locking feature disposed on the second shell section, comprising a rear wall portion, with a complementary portion of the connector block to hold the second shell section in a fixed position with the connector block.

19. A device used to mitigate vibration in a wiring connection between a coupled wiring connector and a connector block that is fixedly engaged with a housing of a vehicle component, the device comprising:

a first shell section that is sized and shaped to operably receive and cover a top portion of the coupled wiring coupler and the connector block, the first section comprising a first latch assembly that selectably, fixedly latches onto an outside wall of the connector block, to operably fixedly engage the first shell with the connector block and a pair of second latch assemblies; and a second shell section that is sized and shaped to operably receive and cover a bottom portion of the coupled wiring coupler and the connector block thereby selectably disposing the coupled wiring coupler and the connector block inside a hollow body formed by the first shell and second shell, the second shell section comprising a pair of third latch assemblies that selectably engage the pair of second latch assemblies to operably, fixedly hold the coupled connector block and the wiring coupler together in electrical engagement.

20. The device of claim 19, the first shell section and second shell section respectively comprising a plurality of ridge features on the front and rear of the respective section, the plurality of ridge features operably engaging a portion of the wiring connector or connector block in a fixed engagement to hold the first shell section and second shell section in a fixed position with the coupled wiring connector and connector block.

* * * * *